United States Patent [19]

Worthington

[11] 3,966,096

[45] June 29, 1976

[54] SATELLITE REFUSE PACKER

[75] Inventor: Stanley W. Worthington, Waterloo, Iowa

[73] Assignee: Wayne Engineering Corporation, Cedar Falls, Iowa

[22] Filed: Dec. 26, 1974

[21] Appl. No.: 536,415

[52] U.S. Cl. .............................. 222/389; 100/218; 222/559; 214/510; 214/83.3; 214/41 A

[51] Int. Cl.[2] ...................... B67D 5/42; G01F 11/00; B60P 1/16

[58] Field of Search ............ 214/82, 83.3, 503, 510, 214/83.36, 83.18, 83.22, 38 BA, 38 R; 298/23 MD; 222/389, 504, 559, 561; 100/218, 188, 188 BT

[56] References Cited

UNITED STATES PATENTS

| | | | |
|---|---|---|---|
| 2,574,315 | 11/1951 | Atkinson | 214/82 X |
| 3,170,578 | 2/1965 | Moreland | 214/82 |
| 3,411,645 | 11/1968 | Herpich et al. | 214/503 |
| 3,443,702 | 5/1969 | Elton et al. | 214/82 X |
| 3,815,765 | 6/1974 | Moser et al. | 214/82 |
| 3,847,072 | 11/1974 | Garrison | 100/218 |

*Primary Examiner*—Albert J. Makay
*Attorney, Agent, or Firm*—Henderson, Strom & Sturm

[57] ABSTRACT

A container adapted to receive refuse materials is pivotally mounted at the lower front end thereof to a truck body. The rear end of the refuse container is made adjustable in vertical height by means of a pair of hydraulic cylinders for pivoting the container about its front pivotal axis. A hydraulically controlled platen blade or ram is disposed within the refuse container for compacting materials disposed within the container, or alternatively pushing materials within the container out of the rear end of the container, when the rear end of the container is open. A door is slideably disposed upon the rear end of the container and this door is also controlled hydraulically by a pair of hydraulic cylinders. The door is vertically adjustable to any degree of opening and may be controlled simultaneously with the control of the platen blade so as to be able to meter the flow of materials out of the rear of the container when unloading.

6 Claims, 8 Drawing Figures

SATELLITE REFUSE PACKER

BACKGROUND OF THE INVENTION

The present invention relates generally to refuse containers, and more particularly to a refuse container which is adjustable in unloading height, and which can meter the flow of refuse therefrom by the simultaneous controlling of the ejector or packing blade and the orifice size of the discharge opening.

One of the newest concepts in the handling of refuse has been to utilize a small refuse container which will fit on a conventional three-quarter ton pick up truck. Such a smaller unit than the conventional large refuse truck, can go to many out of the way places, easier, faster and with much greater economy than the bigger units. This smaller refuse unit is then unloaded into a land fill or other disposal point, or alternatively into one of the larger refuse vehicles referred to above.

Several problems have been encountered, however, when it has been desired to transfer the contents of a smaller refuse container into one of the larger refuse vehicles. One of these problems has been that the smaller truck body is naturally lower to the ground than the body of the larger refuse vehicle. Consequently, when the smaller refuse vehicle was backed up to the larger refuse vehicle for unloading, and both of the rear openings of these two vehicles were opened, the openings did not match. Consequently, if the refuse of the smaller vehicle was to then be ejected, a large portion of this refuse would fall to the ground rather than be pushed into the larger refuse vehicle container.

Another problem with trying to unload from one vehicle to another as mentioned above, is that when the rear door of the smaller refuse unit was opened completely and the platen or packing blade used to eject the refuse therein, a large wall of refuse was exposed and the refuse would flow out in large slugs in a very uneven fashion. This is very undesirable, primarily because much spillage occurs under such conditions.

SUMMARY OF THE INVENTION

The present invention relates to a refuse handling apparatus which has a refuse container pivotally mounted at a forward end thereof. A vertical lift control on the discharge end of the container allows the lower level of the discharge opening to be matched up with that of a receiving opening in a larger vehicle. A rear discharge on the container door has a control associated therewith, to thereby allow the door to form any desired size of discharge opening between fully closed and fully open. An ejector blade within the container has a control adjacent to the rear door control to thereby allow simultaneous and coordinated control of the size of the discharge opening and the rearward movement of the ejector blade to enable controlled metering of the refuse materials from the container discharge opening.

An object of the present invention is to provide a refuse handling apparatus in which the vertical height discharge opening is adjustable.

Another object of the present invention is to provide a rear discharge opening which is adjustable in size.

A further object of the invention is to provide a packing and ejector blade control which is operable simultaneously with a rear discharge opening control, to form a means which will meter the flow of refuse.

Other objects, advantages, and novel features of the present invention will become apparent from the following detailed description of the invention when considered in conjunction with the accompanying drawings.

DESCRIPTION OF THE PREFERRED EMBODIMENTS

Figure 1:
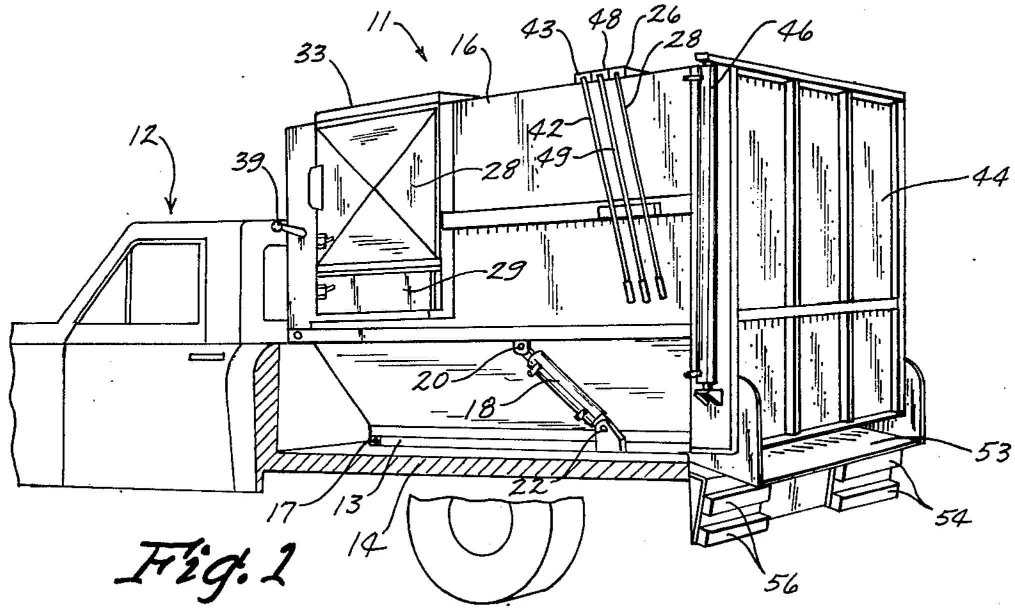
FIG. 1 is a perspective view of the refuse handling apparatus of the present invention with a portion of the supporting truck structure cut away thereby exposing some of the support equipment and controls of the present invention.
Figure 2:
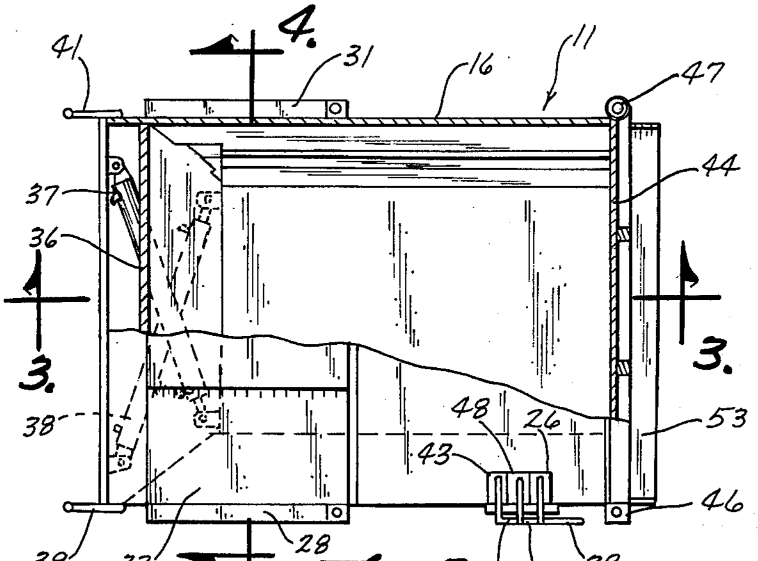
FIG. 2 is a top view of the present invention with a portion of the top cut away to expose the interior of the invention.

Referring now to the drawings wherein like reference numerals designate identical or corresponding parts throughout the several views, FIG. 1 shows the refuse handling apparatus 11 connected to a truck 12.

Figure 6:
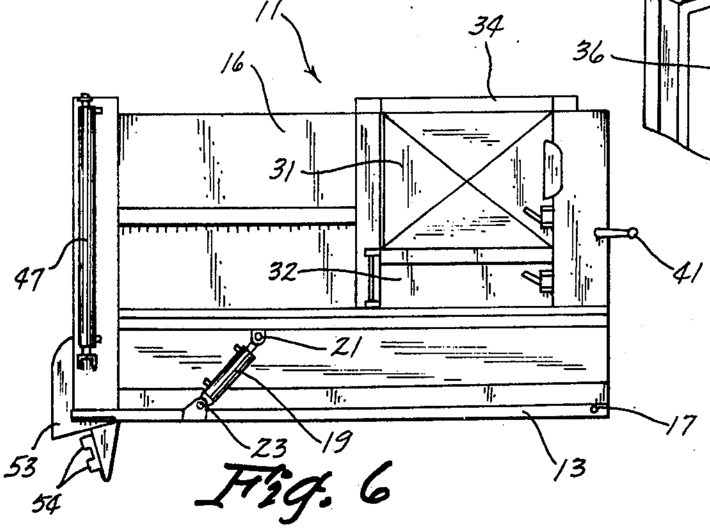
FIG. 6 is a view of the refuse handling apparatus of the present invention separated from its supporting truck structure, but showing the side opposite from that shown in FIG. 1.

A framing structure 13 is rigidly connected to a truck body 14, such as by bolting. A refuse container 16 is then mounted to the frame 13 along a pivotal axis 17 (FIGS. 1 and 6). The rest of the container 16 rests upon the frame 13 when the container 16 is in a lowered position as shown in FIG. 1. Hydraulic cylinders 18 and 19 are connected to each side of the refuse container 16 along pivotal points 20 and 21. The other end of hydraulic cylinder 18 is connected pivotally to the frame 13 at a pivotal point 22 and the other end of the hydraulic cylinder 19 is connected to the frame member 13 at the pivotal point 23. These hydraulic cylinders 18 and 19 are supplied with hydraulic oil under a high pressure by a source of pressure, such as a hydraulic pump (not shown). This source of hydraulic oil under pressure, on its way to the hydraulic cylinders 18 and 19 is connected to a supply line which has a valve 26 therein as shown in FIG. 1. This valve 26 is of a conventional design well known in the art which will send the hydraulic oil under pressure to one side of hydraulic cylinders 18 and 19 while exhausting the other side of the hydraulic cylinders into a sump or reservoir (not shown), and which has another position to reverse this flow. The valve 26 is controlled by a lever control arm 28 which is easily accessible to a person standing at the rear of the refuse container 16 for observing and controlling the unloading process.

A pair of Dutch-style doors 28 and 29 are disposed upon the left side of the vehicle to thereby provide a low and convenient loading height, but yet allowing for a maximum hopper storage. Another set of Dutch-style doors 31 and 32 are pivotally disposed on the right side of the refuse container 16. Additionally, a pair of sliding doors 33 and 34 are located on the top of the vehicle 16 for allowing top loading when necessary.

Figure 3:
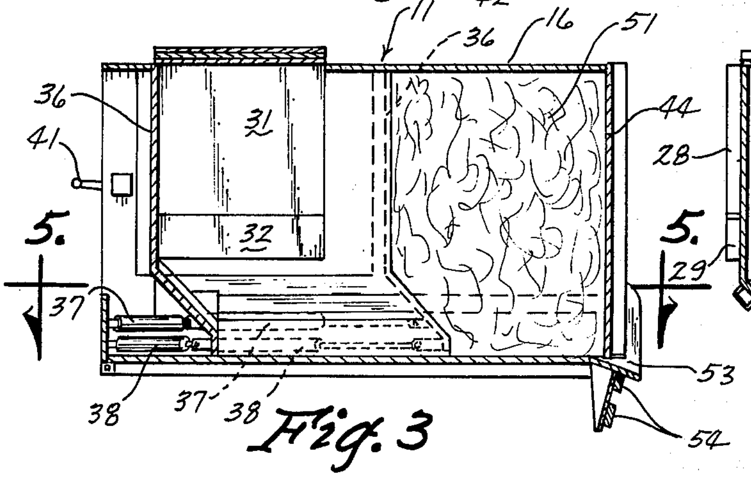
FIG. 3 is a cross sectional view of the embodiment of the present invention taken along line 3—3 of FIG. 2.
Figure 4:
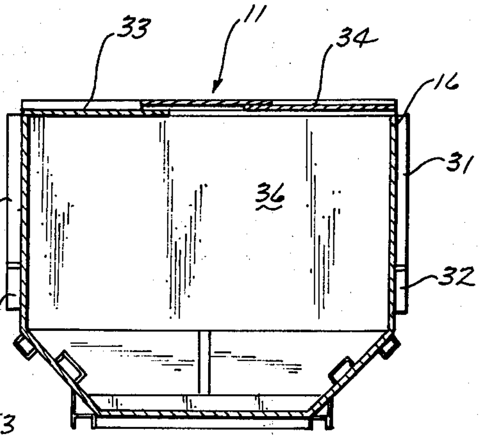
FIG. 4 is a view of the refuse container of the present invention taken along line 4—4 of FIG. 2.
Figure 5:
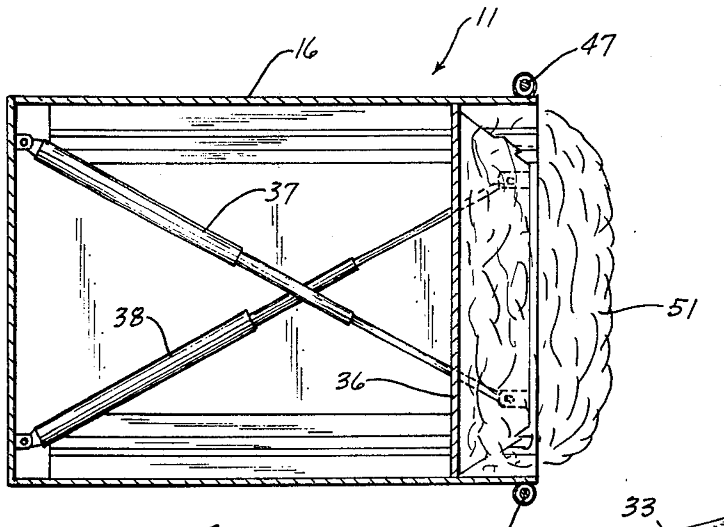
FIG. 5 is a cross sectional view of the present invention with the platen or ejector blade completely extended, and taken along line 5—5 of FIG. 3.
Figure 7:
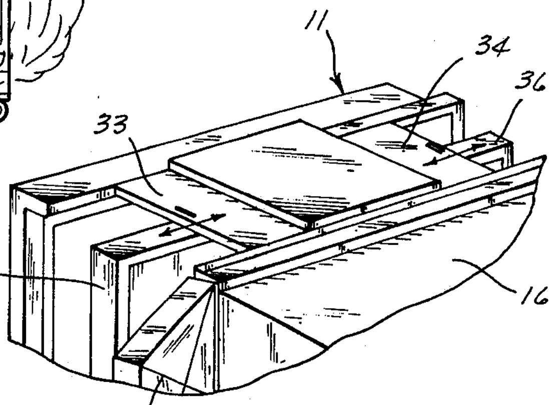
FIG. 7 is a partial perspective view of the door arrangement of the present invention.

A packing or platen blade 36 (FIG. 3) is disposed within the refuse container 16 and is operable by the hydraulic cylinders 37 and 38 to pack the refuse materials periodically. These hydraulic cylinders 37 and 38 are operable to receive the source of hydraulic pressure from the source 24, through valves (not shown) which are controlled by the handles 39 and 41 on the left and right sides respectively of the refuse container 16. Additionally, the ramming mechanism including the cylinders 37 and 38 of the packing blade 36 can be operated by the handle 42 which controls a valve 43, for the purpose of using the packing blade 36 as an ejection blade, a procedure which will be described hereafter.

Figure 8:
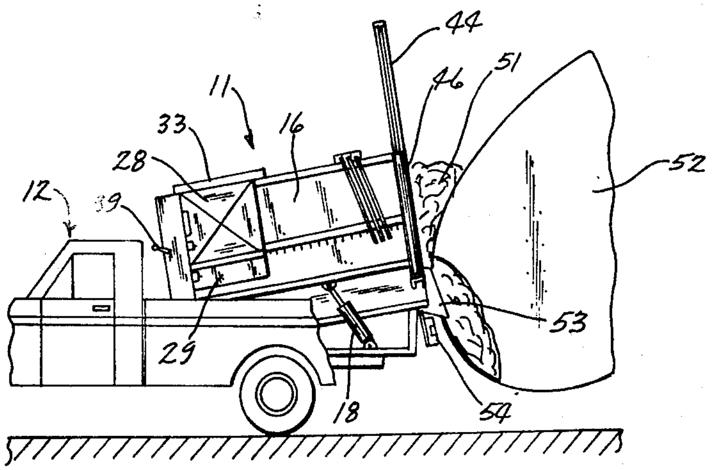
FIG. 8 is a side elevational view of the present invention in the process of unloading refuse into a larger refuse accepting vehicle or container.

A rear door 44 is slideably received upon the rear end of the refuse container 16 and is moveable from the position shown in FIG. 1, to the position shown in FIG. 8. This door 44 is controlled by a pair of hydraulic cylinders, 46 on the left side of container 16, and 47 on the right side of the refuse container 16. These hydraulic cylinders 46 and 47 are, in turn, controlled by a valve 48 of a conventional design which is, in like fashion, controlled by a lever arm 49. By moving the lever arm 49 and thereby operating the valve 48, the hydraulic cylinders 46 and 47 are simultaneously controlled to move the door 44 to any desired position between a completely closed position, as shown in FIG. 1, to the completely open position shown in FIG. 8.

In operation, the small satellite refuse packer of the instant invention would go to various out of the way places which are difficult to reach by a larger conventional refuse gathering vehicle. Once refuse is placed into one of the front or top doors, one of handles 39 and 41 is operated to cause the packing blade 36 to compact the refuse 51, for example as shown in dashed lines in FIG. 3. Once the refuse container 16 is completely packed full, the entire unit is then backed up to a large conventional refuse vehicle 52, as shown in FIG. 8. The handle or control arm 28 is then moved to activate the hydraulic cylinder 18 to thereby lengthen the effective length of the cylinders 18 and 19, to the position desired, as shown in FIG. 8, such that the rear lip or chute 53 is resting upon the bottom of the rear opening of the larger refuse gathering vehicle 52. Rubber bumpers 54 are provided below the chute to prevent any damage to either vehicle when the two vehicles 12 and 52 are being backed together in a position such as shown for example in FIG. 8.

Once the bottom portions of each of these two vehicles 12 and 52 are matched up as discussed in the previous paragraph, then the control arm lever 49 is moved to effect a control over the hydraulic cylinders 46 and 47, to thereby move the rear door 44 upwardly. Once the rear door 44 has been raised to some extent, the operator will also move the lever control arm 42 to thereby cause the packing and ejector blade 36 to move forwardly, and thereby tend to force some of the refuse materials 51 out of the rear opening in the rear end of the refuse container 16. The operator can consequently very easily control the flow of refuse material 51 from the rear of the container by controlling simultaneously the movement of the ejector blade 36 and the corresponding size of the opening formed by the position of the rear door 44.

It will be understood by those skilled in the art that it is extremely important that there be a controlled flow of refuse from the rear of the refuse container 16. In the past it has been found that when a door such as door 44 is opened completely, and the ejector blade moved, that the entire wall of the refuse within the refuse container was exposed. This large quantity of refuse then merely fell uncontrollably towards the larger truck. This usually jammed up the rear loader of the larger vehicle, and it therefore had to be unloaded by hand until the packing mechanism in the rear loader of the larger vehicle could catch up with itself. Additionally, when so much refuse was exposed at one time, much of the refuse was spilled, especially on windy days.

Accordingly, it can be seen that the unique combination of elements of the disclosed embodiment allow simultaneous control of the movement of the ejector blade 36 and control of the size of the rear opening, thereby producing a genuine improvement over the prior art. The additional feature of being able to adjust the bottom level of the rear opening provides an extremely versatile refuse handling apparatus. The other features of the present invention also contribute significantly to the success of the disclosed invention.

Accordingly, it can be seen that the embodiment of the instant invention disclosed herewithin accomplishes all of the objects set forth above. Obviously many modifications and variations of the present invention are possible in light of the above teachings. It is therefor to be understood that, within the scope of the appended claims, the invention may be practiced otherwise as specifically described.

I claim:

1. A vehicle for handling refuse comprising:

apparatus having supporting means mounted to the vehicle body;

a container pivotally mounted to said supporting means at the front end thereof along a pivotal axis, said container having a floor;

means for pivoting the container about said pivotal axis to thereby selectively adjust the vertical height of the other end of said container for unloading refuse at the adjusted height;

door means for opening or closing said rear end of the container, said door means comprising a single door having a bottom edge, said bottom edge being adjacent to said floor in the closed position thereof;

means for slidably connecting said door means to said rear end of the container for vertical adjustment thereof;

means having an operator control member for controlling the position of said door means with respect to the container;

ram means operably disposed within said container for selectively packing materials placed within the container when the door is closed and for ejecting materials out from said rear end of the container when said door is at least partially open; and means having an operator control lever adjacent to said operator control member of said controlling means for operating the ram means, whereby the positions of said ram means and said door means can be simultaneously controlled by one person for metering refuse from said container.

2. A refuse handling apparatus as defined in claim 1 wherein said means for controlling the position of the door comprises at least one hydraulic cylinder.

3. A refuse handling apparatus as defined in claim 1 wherein said means for pivoting the container about the pivotal axis comprises at least one hydraulic cylinder operably connected at one end to the supporting means and operably connected at the other end thereof to the container.

4. A refuse handling apparatus as defined in claim 1 wherein said door means is substantially flat and is disposed substantially in a plane fixed with respect to said container in all operative positions of said door means.

5. A refuse handling apparatus as defined in claim 1 including a rearwardly extending lip attached to the floor of the container and extending across the width of the container for bridging any gap between said container and any other container into which refuse is being transferred.

6. A refuse handling apparatus as defined in claim 1 wherein said operator control member for the door means and the operator control lever for the ram means are mounted on the container near the rear end thereof so that an operator can view the refuse as it exits the container to thereby determine what adjustments in the ram means and door means need to be made.

* * * * *